United States Patent
Eluri

(10) Patent No.: US 12,321,264 B1
(45) Date of Patent: Jun. 3, 2025

(54) TRANSACTION ID ACCELERATOR FOR EFFICIENT GARBAGE COLLECTION OF OLD VERSIONS

(71) Applicant: Google LLC, Mountain View, CA (US)

(72) Inventor: Amarnadh Sai Eluri, Mountain House, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/429,801

(22) Filed: Feb. 1, 2024

(51) Int. Cl.
 *G06F 12/00* (2006.01)
 *G06F 12/02* (2006.01)
 *G06F 12/1009* (2016.01)

(52) U.S. Cl.
 CPC ...... *G06F 12/0253* (2013.01); *G06F 12/1009* (2013.01)

(58) Field of Classification Search
 CPC .......... G06F 12/0253; G06F 12/1009
 See application file for complete search history.

(56) References Cited

U.S. PATENT DOCUMENTS

| 2020/0293545 A1 | 9/2020 | Li et al. |
| 2020/0379976 A1* | 12/2020 | Finkelstein ......... G06F 16/2379 |
| 2022/0318223 A1 | 10/2022 | Ahluwalia et al. |

OTHER PUBLICATIONS

"Database Concurrency in PostgreSQL", Mohan Saraswathipura, Aug. 11, 2023.
"PostgreSQL Server Applications" Nov. 24, 2023.

* cited by examiner

*Primary Examiner* — Shawn X Gu
(74) *Attorney, Agent, or Firm* — Shumaker & Sieffert, P.A.

(57) ABSTRACT

A method for garbage collection includes obtaining a request to perform garbage collection on a target table. The target table includes a plurality of pages. The method includes determining, based on the request, a garbage collection transaction identifier (ID) specifying a global minimum transaction ID for garbage collection. For each respective page of a first set of pages of the plurality of pages, the method includes retrieving, from a page transaction ID table, a respective page minimum transaction ID corresponding to the respective page. The page transaction ID table is different from the target table. The method also includes determining that the respective page minimum transaction ID is greater than the global minimum transaction ID and, based on determining that the respective page minimum transaction ID is greater than the global minimum transaction ID, skipping garbage collection of the respective page without accessing the respective page.

20 Claims, 6 Drawing Sheets

TRANSACTION ID ACCELERATOR FOR EFFICIENT GARBAGE COLLECTION OF OLD VERSIONS

TECHNICAL FIELD

This disclosure relates to transaction ID accelerators for efficient garbage collection of old versions.

BACKGROUND

A garbage collector is generally a background database process that performs memory management by removing unneeded data from database pages read into memory. That is, a garbage collector reclaims space occupied by data that is no longer needed in the database. For example, data that is expired or obsolete may be removed by the garbage collection process. Table level garbage collection operations in a database often read the content of every page of the table to qualify a row for garbage collection.

SUMMARY

One aspect of the disclosure provides a method for efficient garbage collection and other operations. The computer-implemented method is executed by data processing hardware that causes the data processing hardware to perform operations. The operations include obtaining a request to perform garbage collection on a target table and/or database. The target table includes a plurality of pages, and each page of the plurality of pages includes a plurality of rows and columns of data. The operations include determining, based on the request, a garbage collection transaction identifier (ID) specifying a global minimum transaction ID for garbage collection. For each respective page of a first set of pages of the plurality of pages, the operations include retrieving, from a page transaction ID table, a respective page minimum transaction ID corresponding to the respective page. The page transaction ID table is different from the target table. The operations also include determining that the respective page minimum transaction ID is greater than the global minimum transaction ID. The operations include, based on determining that the respective page minimum transaction ID is greater than the global minimum transaction ID, skipping garbage collection of the respective page without accessing the respective page. For each respective page of a second set of pages of the plurality of pages, the operations include retrieving, from the page transaction ID table, the respective page minimum transaction ID corresponding to the respective page. The operations also include determining that the respective page minimum transaction ID is less than or equal to the global minimum transaction ID and, based on determining that the respective page minimum transaction ID is less than or equal to the global minimum transaction ID, accessing the respective page to perform garbage collection.

Implementations of the disclosure may include one or more of the following optional features. In some implementations, the operations further include receiving a request to modify one of the pages of the plurality of pages of the target table. Based on the request to modify the one of the pages, the operations include modifying the one of the pages, the modification associated with a transaction ID and retrieving, from the page transaction ID table, the respective page minimum transaction ID corresponding to the one of the pages. The operations may also include determining that the transaction ID associated with the modification is lower than the respective page minimum transaction ID corresponding to the one of the pages. Based on determining that the transaction ID associated with the modification is lower than the respective page minimum transaction ID corresponding to the one of the pages, the operations include updating the respective page minimum transaction ID with the respective page minimum transaction ID corresponding to the one of the pages.

In some examples, the operations further include, after accessing the respective page to perform garbage collection, for each respective page of the second set of pages of the plurality of pages, determining an updated page minimum transaction ID for the respective page of the second set of pages of the plurality of pages and updating the page transaction ID table with the updated page minimum transaction ID for the respective page of the second set of pages of the plurality of pages. In some of these examples, determining the updated minimum transaction ID for the respective page of the second set of pages of the plurality of pages includes retrieving a row minimum transaction ID for each row of the respective page and determining a smallest row minimum transaction ID of the rows of the respective page. Additionally or alternatively, updating the page transaction ID table with the updated minimum transaction ID for the respective page of the second set of pages of the plurality of pages includes writing a generic write-ahead log (WAL) record. The WAL record may be written in batches (i.e., one WAL record for a batch of page updates).

The page transaction ID table may include a plurality of ID pages. Each ID page of the page transaction ID table may include a plurality of page minimum transaction IDs.

Optionally, the operations further include, for each respective page of a third set of pages of the plurality of pages, determining that the respective page does not have a corresponding page minimum transaction ID. Based on determining that the respective page does not have the corresponding page minimum transaction ID, the operations may include accessing the respective page to perform garbage collection. After accessing the respective page to perform garbage collection, the operations may include determining the minimum transaction ID for the respective page and updating the page transaction ID table with the determined minimum transaction ID for the respective page.

In some implementations, the operations further include obtaining a request to perform a sequential scan on the target table. In these implementations, the operations also include determining, based on the request, a sequential scan transaction ID specifying a maximum transaction ID for the sequential scan. For each respective page of a third set of pages of the plurality of pages, the operations include retrieving, from the page transaction ID table, the respective page minimum transaction ID corresponding to the respective page and determining that the respective page minimum transaction ID is greater than the sequential scan transaction ID. Based on determining that the respective page minimum transaction ID is greater than the sequential scan transaction ID, the operations include skipping sequential scanning of the respective page without accessing the respective page. In some of these implementations, the operations further include, for each respective page of a fourth set of pages of the plurality of pages, retrieving, from the page transaction ID table; determining that the respective page minimum transaction ID is less than or equal to the sequential scan transaction ID; and, based on determining that the respective page minimum transaction ID is less than or equal to the sequential scan transaction ID, scanning the respective page. Retrieving the respective page minimum transaction ID corresponding to the respective page may include determining a location of the respective page minimum transaction ID based on a logical shift of a page number of the respective page.

Another aspect of the disclosure provides a system for efficient garbage collection and other operations. The system includes data processing hardware and memory hardware in communication with the data processing hardware. The memory hardware stores instructions that when executed on the data processing hardware cause the data processing hardware to perform operations. The operations include obtaining a request to perform garbage collection on a target table. The target table includes a plurality of pages, and each page of the plurality of pages includes a plurality of rows and columns of data. The operations include determining, based on the request, a garbage collection transaction identifier (ID) specifying a global minimum transaction ID for garbage collection. For each respective page of a first set of pages of the plurality of pages, the operations include retrieving, from a page transaction ID table, a respective page minimum transaction ID corresponding to the respective page. The page transaction ID table is different from the target table. The operations also include determining that the respective page minimum transaction ID is greater than the global minimum transaction ID. The operations include, based on determining that the respective page minimum transaction ID is greater than the global minimum transaction ID, skipping garbage collection of the respective page without accessing the respective page. For each respective page of a second set of pages of the plurality of pages, the operations include retrieving, from the page transaction ID table, the respective page minimum transaction ID corresponding to the respective page. The operations also include determining that the respective page minimum transaction ID is less than or equal to the global minimum transaction ID and, based on determining that the respective page minimum transaction ID is less than or equal to the global minimum transaction ID, accessing the respective page to perform garbage collection.

This aspect may include one or more of the following optional features. In some implementations, the operations further include receiving a request to modify one of the pages of the plurality of pages of the target table. Based on the request to modify the one of the pages, the operations include modifying the one of the pages, the modification associated with a transaction ID and retrieving, from the page transaction ID table, the respective page minimum transaction ID corresponding to the one of the pages. The operations may also include determining that the transaction ID associated with the modification is lower than the respective page minimum transaction ID corresponding to the one of the pages. Based on determining that the transaction ID associated with the modification is lower than the respective page minimum transaction ID corresponding to the one of the pages, the operations include updating the respective page minimum transaction ID with the respective page minimum transaction ID corresponding to the one of the pages.

In some examples, the operations further include, after accessing the respective page to perform garbage collection, for each respective page of the second set of pages of the plurality of pages, determining an updated page minimum transaction ID for the respective page of the second set of pages of the plurality of pages and updating the page transaction ID table with the updated page minimum transaction ID for the respective page of the second set of pages of the plurality of pages. In some of these examples, determining the updated minimum transaction ID for the respective page of the second set of pages of the plurality of pages includes retrieving a row minimum transaction ID for each row of the respective page and determining a smallest row minimum transaction ID of the rows of the respective page. Additionally or alternatively, updating the page transaction ID table with the updated minimum transaction ID for the respective page of the second set of pages of the plurality of pages includes writing a generic write-ahead log (WAL) record.

The page transaction ID table may include a plurality of ID pages. Each ID page of the page transaction ID table may include a plurality of page minimum transaction IDs.

Optionally, the operations further include, for each respective page of a third set of pages of the plurality of pages, determining that the respective page does not have a corresponding page minimum transaction ID. Based on determining that the respective page does not have the corresponding page minimum transaction ID, the operations may include accessing the respective page to perform garbage collection. After accessing the respective page to perform garbage collection, the operations may include determining the minimum transaction ID for the respective page and updating the page transaction ID table with the determined minimum transaction ID for the respective page.

In some implementations, the operations further include obtaining a request to perform a sequential scan on the target table. In these implementations, the operations also include determining, based on the request, a sequential scan transaction ID specifying a maximum transaction ID for the sequential scan. For each respective page of a third set of pages of the plurality of pages, the operations include retrieving, from the page transaction ID table, the respective page minimum transaction ID corresponding to the respective page and determining that the respective page minimum transaction ID is greater than the sequential scan transaction ID. Based on determining that the respective page minimum transaction ID is greater than the sequential scan transaction ID, the operations include skipping sequential scanning of the respective page without accessing the respective page. In some of these implementations, the operations further include, for each respective page of a fourth set of pages of the plurality of pages, retrieving, from the page transaction ID table; determining that the respective page minimum transaction ID is less than or equal to the sequential scan transaction ID; and, based on determining that the respective page minimum transaction ID is less than or equal to the sequential scan transaction ID, scanning the respective page. Retrieving the respective page minimum transaction ID corresponding to the respective page may include determining a location of the respective page minimum transaction ID based on a logical shift of a page number of the respective page.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Relation level operations on tables of databases such as garbage collection operations or sequential scan operations often read the contents of every page of a database to qualify each row. Reading a page of a database consumes resources, such as I/O resources and CPU resources. However, often there are many data pages that the garbage collection operations (or other relational level operations) do not need to interact with. Thus, any additional information that avoids reading unnecessary pages will improve the end-to-end performance of the specific operations.

More particularly, data within a database can generally be classified into one of three categories. The first category is cold data that refers to data that has been written for some time and is visible to all jobs within the system. The second category is warm data that has been modified recently and is not visible to some jobs. The third category is hot data that is uncommitted or committed but not visible to any jobs in the system. When table level operations reduce the amount of work by determining the nature of the data, then the performance of the operations will be improved (e.g., end-to-end response time will be reduced). For example, a page in cold data that is visible to all jobs may be skipped by a snapshot or by hints. Similarly, a page of hot data may be skipped because it is not visible to the process.

As another example, a garbage collection process often has a garbage collection point that indicates a minimum transaction ID for the process to consider. When the garbage collection point is in warm data or hot data, then there may be data pages that contain future data and are not relevant for the garbage collection process. Accessing unnecessary data involves considerable I/O and CPU resources.

Implementations herein are directed toward a transaction identifier (ID) accelerator that improves the efficiency of garbage collection operations or other relational level operations such as sequential scans. The transaction ID accelerator prunes page space using snapshot and/or accelerator information to improve performance of these operations. For example, the transaction ID accelerator maintains a minimum transaction ID per page of a database and determines which pages need to be accessed based on the operation snapshot and/or corresponding minimum transaction ID.

Figure 1:
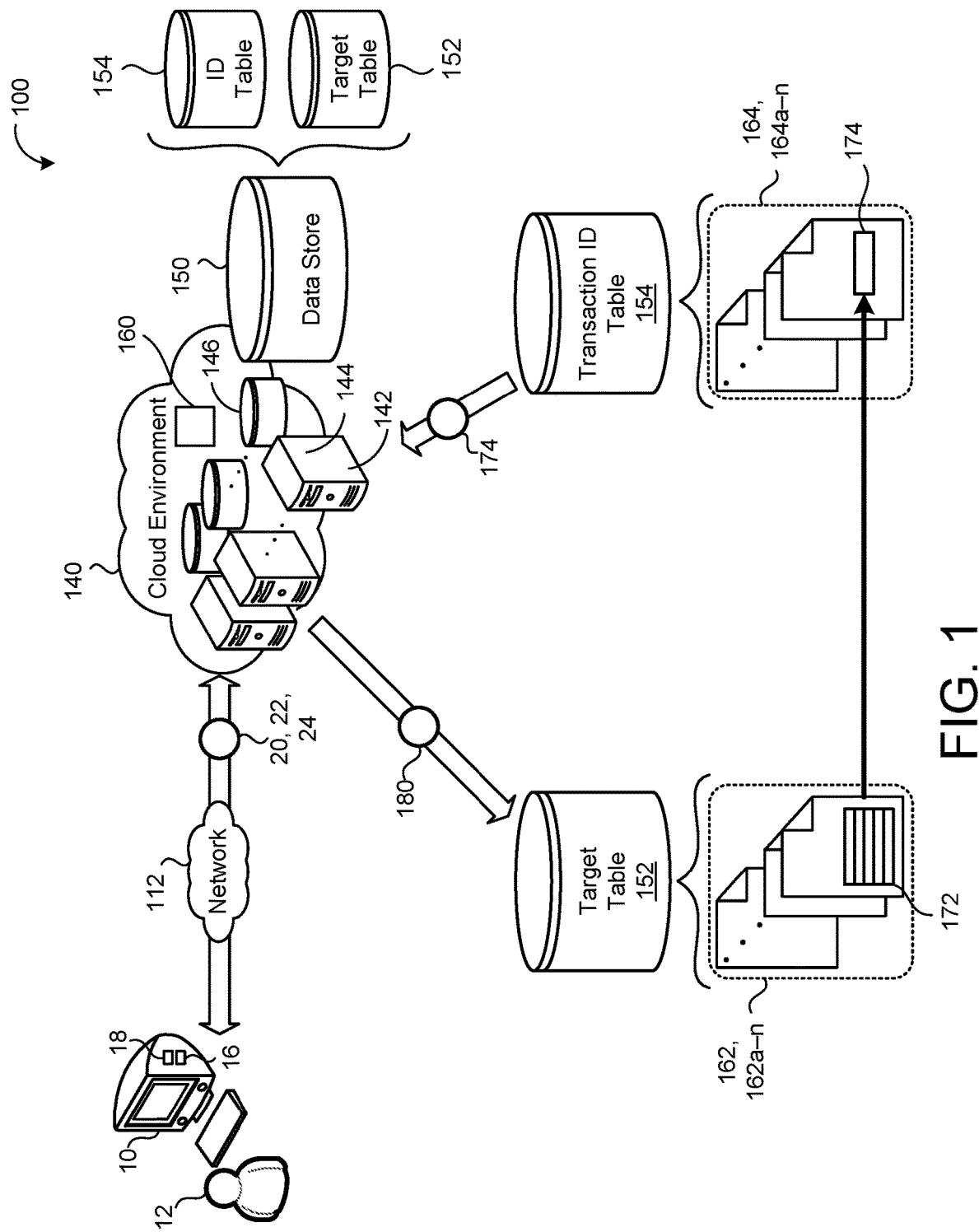
FIG. 1 is a schematic view of an example system for performing efficient garbage collection and other operations.

Referring to FIG. 1, in some implementations, an accelerator system 100 includes a distributed database 140 in communication with one or more user devices 10 via a network 112. The user device 10 may correspond to any computing device, such as a desktop workstation, a laptop workstation, or a mobile device (i.e., a smart phone) that can be used to access a cloud-based distributed database (e.g., distributed database 140). The user device 10 includes computing resources 18 (e.g., data processing hardware) and/or storage resources 16 (e.g., memory hardware).

The distributed database 140 is a distributed system (e.g., a cloud environment using multiple computers/servers) having scalable/elastic resources 142 including computing resources 144 (e.g., data processing hardware) and/or storage resources 146 (e.g., memory hardware). A data store 150 (i.e., a remote storage device) may be overlain on the storage resources 146 to allow scalable use of the storage resources 146 by one or more of the clients (e.g., the user device 10) or the computing resources 144. The data store 150 is configured to any number of tables or databases for any number of users. For example, the data store 150 a target table 152 (or database) that stores user data for a user 12 of the system 100. The target table 152 includes a plurality of pages 162, 162a-n (also referred to as data pages). Each page 162 of the target table 152 may be a fixed-size unit of storage that includes multiple rows and or columns of the target table 152. Each row of the target table 152 may include or correspond to a row transaction ID 172. The row transaction ID 172 identifies the last transaction that modified (e.g., added, updated, or deleted) the row.

The data store 150 may also include a transaction ID table 154 (or database) that maintains page minimum transaction IDs 174, 174a-n for the target table 152. Each page minimum transaction ID 174 represents the oldest or earliest (e.g., the smallest or lowest) row transaction ID 172 for a corresponding page 162 of the target table 152. For example, when a particular page 162 of the target table 152 has three rows with three row transaction IDs 172 of "10", "50", and "75", the transaction ID table 154 maintains a page minimum transaction ID 174 with the value of "10" that corresponds to the particular page 162 of the target table 152.

In some examples, the smallest row transaction ID 172 of a page 162 is the page minimum transaction ID 174 for the page 162. In other examples, the target table 152 may "wrap" row transaction IDs 172 around after reaching a maximum number of transactions supported by the size of the row transaction ID 172. In these examples, the smallest row transaction ID 172 may not be the page minimum transaction ID 174 or the "oldest" row transaction ID 172. Yet other examples may use other techniques (such as decrementing the row transaction ID 172). Regardless of the system, the page minimum transaction ID 174 represents the oldest row transaction ID 172 remaining within the page 162. That is, the page minimum transaction ID 174 represents the row transaction ID 172 that began execution the furthest back in time from any transactions that have completed for the page 162. Notably, transactions that begin after another transaction but complete before the other transaction may have a larger or later row transaction ID 172. For example, when a first transaction begins executing at a first point in and a second transaction begins executing at a second point in time after the first point in time, the second transaction may complete execution prior to the first transaction, but the first transaction will have the "older" row transaction ID 172.

The distributed database 140 executes a transaction ID accelerator 160 to maintain the transaction ID table 154 and to accelerate relational level operations on the target table 152. For example, the transaction ID accelerator 160 assists in garbage collection or sequential scans of the target table 152. The transaction ID accelerator 160 obtains a request 20 to perform an operation, such as garbage collection or a sequential scan, on the target table 152. The request 20 may originate from the user 12 (i.e., via the user device 10). Alternatively, the remote system 140 may originate the request 20 based on, for example, a scheduled operation (e.g., automatic garbage collection) or another operation to the target table 152.

In a conventional database system, typically each page of the database is scanned to determine if any garbage collection is necessary. This is costly in computational resources and can reduce access (e.g., via exclusive locks) to the database. In contrast, the transaction ID accelerator 160, based on the request 20, determines a garbage collection transaction ID 22 (also referred to herein as a global minimum transaction ID 22 or garbage collection point 22) that specifies a minimum transaction ID for garbage collection. That is, the garbage collection transaction ID 22 specifies a transaction ID that serves as a breakpoint or garbage collection point for the garbage collection operation. Thus, rows with a transaction ID greater than the garbage collection transaction ID 22 are not eligible for garbage collection by the garbage collection operation.

The transaction ID accelerator 160, for each respective page 162 of the target table 152, retrieves, from the transaction ID table 154, the respective page minimum transaction ID 174 corresponding to the respective page 162. Notably, the transaction ID table 154 is a different table and/or database than the target table 152, and thus transactions with the transaction ID table 154 do not compete for access with transactions with the target table 152. In some implementations, the transaction ID accelerator 160 maintains a cache of recently modified, recently retrieved, and/or frequently accessed page minimum transaction IDs 174 to reduce the number of accesses required to the transaction ID table 154.

In some examples, the transaction ID table 154 includes multiple transaction ID pages 164, 164a-n of page minimum transaction IDs 174. Each transaction ID page 164 includes multiple page minimum transaction IDs 174 and thus reading a single transaction ID page 164 from the transaction ID table 154 retrieves a number of page minimum transaction IDs 174 for a corresponding number of pages 162 of the target table 152 (e.g., a page 164 of the transaction ID table 154 includes 1024 page minimum transaction IDs 174 for 1024 corresponding pages 162 of the target table 152).

The transaction ID accelerator 160, for each respective page 162 of the target table 152, determines whether the respective page minimum transaction ID 174 is greater (i.e., "newer" or occurred at a later point in time) than the garbage collection transaction ID 22. Based on determining that the respective page minimum transaction ID 174 of a particular page 162 is greater than (or, in some examples, equal to) or newer than the garbage collection transaction ID 22 (i.e., the global minimum transaction ID), the transaction ID accelerator 160 skips (or informs another process, such as a garbage collector process, to skip) the particular page 162 for the garbage collection process without accessing the particular page 162. That is, the transaction ID accelerator 160 determines that the particular page 162 does not need garbage collection without ever accessing the particular page 162 (and thus incurring the cost of such an access).

Based on determining that the respective page minimum transaction ID 174 of a different particular page 162 is less than (or in some examples equal to) or older than the garbage collection transaction ID 22 (i.e., the global minimum transaction ID), the transaction ID accelerator 160 accesses (or informs another process, such as a garbage collector process, to access) the particular page 162 for the garbage collection process (or flags the page 162 for garbage collection by another process). That is, when the respective page minimum transaction ID 174 of a different particular page 162 indicates that the oldest transaction associated with the page 162 is older than the garbage collection transaction ID 22, the page 162 is a candidate for garbage collection and must be accessed or flagged for access for a garbage collection operation 180.

Figure 2:
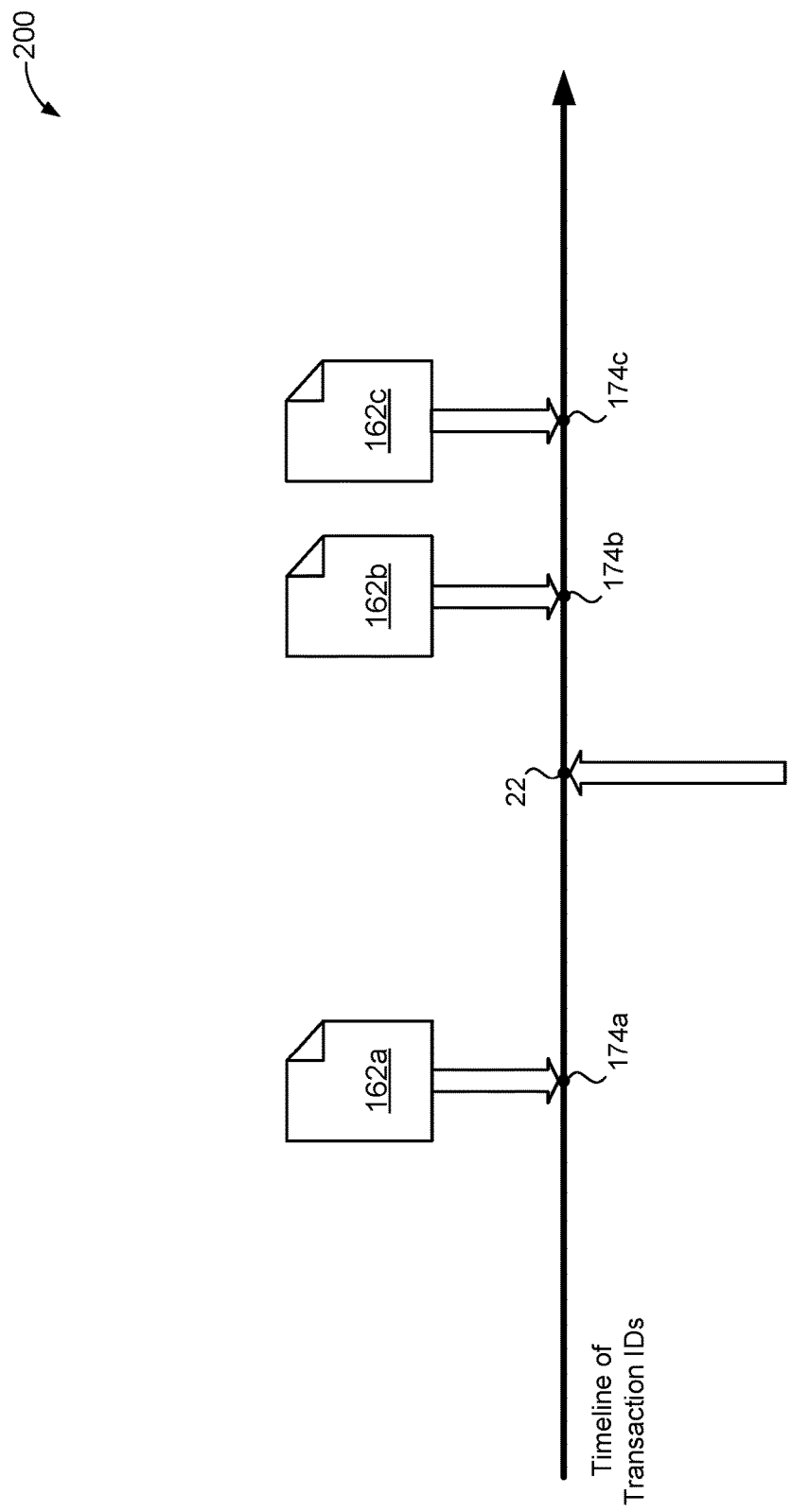
FIG. 2 is a schematic view of a timeline of transactions and corresponding transaction identifiers.

Referring now to FIG. 2, an exemplary timeline of transaction IDs is illustrated. Here, transaction IDs are older (i.e., were created at an earlier point in time) the farther to the left on the timeline the transaction IDs are located. In this example, three pages 162a-c of the target table 152 each have a respective page minimum transaction ID 174a-c (i.e., stored at the transaction ID table 154). Here, a first page 162a has a first page minimum transaction ID 174a that is older (i.e., more to the left) than the garbage collection point 22. Accordingly, the first page 162a will be accessed for garbage collection. In contrast, a second page 162b and a third page 162c have a second page minimum transaction ID 174b and a third minimum transaction ID 174c respectively that are each newer (i.e., more to the right) than the garbage collection point 22. Accordingly, both the second page 162b and the third page 162c may be skipped during the garbage collection process (i.e., the pages 162b-c need not be accessed).

Referring back to FIG. 1, the transaction ID accelerator 160 maintains the transaction ID table 154 to ensure that the page minimum transaction IDs 174 remain current and accurate. In some implementations, the transaction ID accelerator 160 receives a database request 24 to modify one of the pages 162 of the target table 152. Based on the request 24 to modify the one of the pages 162, the transaction ID accelerator 160 modifies the page 162 (e.g., adds, deletes, or updates rows of the page 162). The modification is associated with a row transaction ID 172. That is, the modification causes the row transaction ID 172 of the affected rows to be updated. The transaction ID accelerator 160 retrieves, from the transaction ID table 154, the respective page minimum transaction ID 174 that corresponds to the modified page 162. The transaction ID accelerator 160 may determine that the transaction ID associated with the modification is lower (i.e., older) than the respective page minimum transaction ID 174 corresponding to the modified page 162. Based on determining that the transaction ID associated with the modification is lower than the respective page minimum transaction ID 174 corresponding to the modified page 162, the transaction ID accelerator 160, in some examples, updates the respective page minimum transaction ID 174 stored at the transaction ID table 154 with the respective page minimum transaction ID 174 corresponding to the modified page 162. That is, every time a page 162 of the target table 152 is modified or updated, the transaction ID accelerator 160 determines whether any page minimum transaction IDs 174 of the modified page(s) 162 must be updated at the transaction ID table 154. Because the transaction ID accelerator 160 verifies this on each modification of the target table 152, the transaction ID accelerator 160 ensures that the transaction ID table 154 remains up to date. In some examples, the update to the transaction ID table 154 is atomic with the update to the target table 152, such that the operations are indivisible in such a way that either both occur or neither occur.

In some implementations, after performing the relational level operation (e.g., garbage collection) requested by the request 20, the transaction ID accelerator 160, after accessing a respective page 162 to perform garbage collection (or other relational level operation), determines an updated page minimum transaction ID 174 for the respective page 162. For example, the garbage collection removed one or more rows that caused the page minimum transaction ID 174 for the page to change (i.e., the row that previously was associated with the page minimum transaction ID 174 was deleted). The transaction ID accelerator 160 may update the transaction ID table 154 with the updated page minimum transaction ID 174 for the respective page 162. In some implementations, updating the transaction ID table 154 with the updated minimum transaction ID 172 for a respective page 162 of the target table 152 includes writing a generic write-ahead log (WAL) record to persist the transaction to the transaction ID table 154.

With continued reference to FIG. 1, the transaction ID accelerator 160 may migrate existing databases or integrate new databases for use with the transaction ID accelerator 160. In some implementations, the transaction ID accelerator 160 determines that a respective page 162 of the target table 152 (e.g., a page 162 modified due to a request 24) does not have a corresponding page minimum transaction ID 174. For example, the target table 152 is new or migrating to use the transaction ID accelerator 160 and some or all of the transaction ID table 154 has yet to be populated or created. Based on determining that the respective page 162 does not have the corresponding page minimum transaction ID 174, the transaction ID accelerator 160 may access the respective page 162 to perform garbage collection. That is, when no corresponding page minimum transaction ID 174 yet exists, the transaction ID accelerator 160 may always default to flagging or accessing the page 162 for garbage collection. After accessing the respective page 162 to perform garbage collection, the transaction ID accelerator 160 determines the page minimum transaction ID 174 for the respective page 162 and updates the transaction ID table 154 with the determined page minimum transaction ID 174 for the respective page 162. In this way, the transaction ID accelerator 160 will gradually or incrementally create or populate the transaction ID table 154 without requiring substantial additional access or resources from the target table 152. During the initial migration/population of the transaction ID table 154, the transaction ID accelerator 160 may access some pages 162 that do not require garbage collection, but as the transaction ID table 154 becomes populated, such accesses will become rarer and eventually nonexistent.

Figure 3:
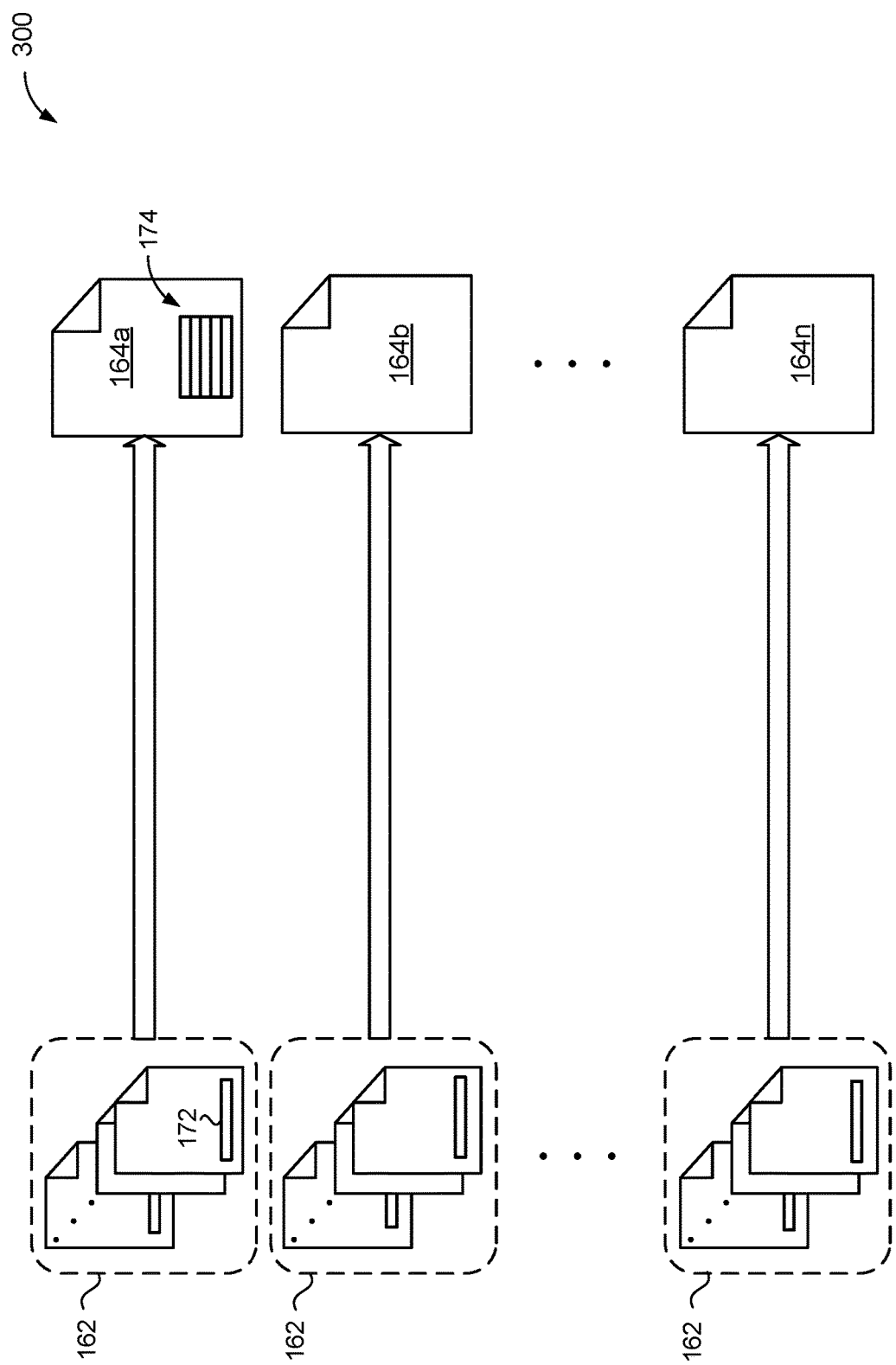
FIG. 3 is a schematic view mapping minimum transaction identifiers of pages of a database to pages of a transaction identifier database.

Referring now to FIG. 3, a schematic view 300 illustrates mapping the page minimum transaction ID 174 of pages 162 (derived from the row transaction IDs 172 of the page) to the corresponding transaction ID pages 164. Here, each transaction ID page 164 stores multiple page minimum transaction IDs 174 (i.e., for a range of data pages 162). In some implementations, the transaction ID accelerator 160 retrieves the respective page minimum transaction ID 174 corresponding to a respective page 162 by determining a location of the respective page minimum transaction ID 174 based on a logical shift of a page number (i.e., data page number) of the respective page 162. For example, each page minimum transaction ID 174 is four bytes in length and each transaction ID page 164 stores up to 1024 page minimum transaction IDs 174. In this example, one transaction ID page 164 covers or corresponds to 1024 pages 162 of the target table 152. Accordingly, the transaction ID accelerator 160 may determine which transaction ID page 164 to access to find the page minimum transaction ID 174 of a particular page by taking the ID of the particular page and logically shifting right ten bits (i.e., transaction ID page 164=target table page 162>>10). This allows the transaction ID accelerator 160 to quickly determine the location of the desired page minimum transaction ID 174 with minimal computation. Optionally, the transaction ID accelerator 160 may perform all writes to the transaction ID table 154 using an exclusive content lock while the transaction ID accelerator 160 may perform all reads of the transaction ID table 154 using a shared content lock.

Figure 4:
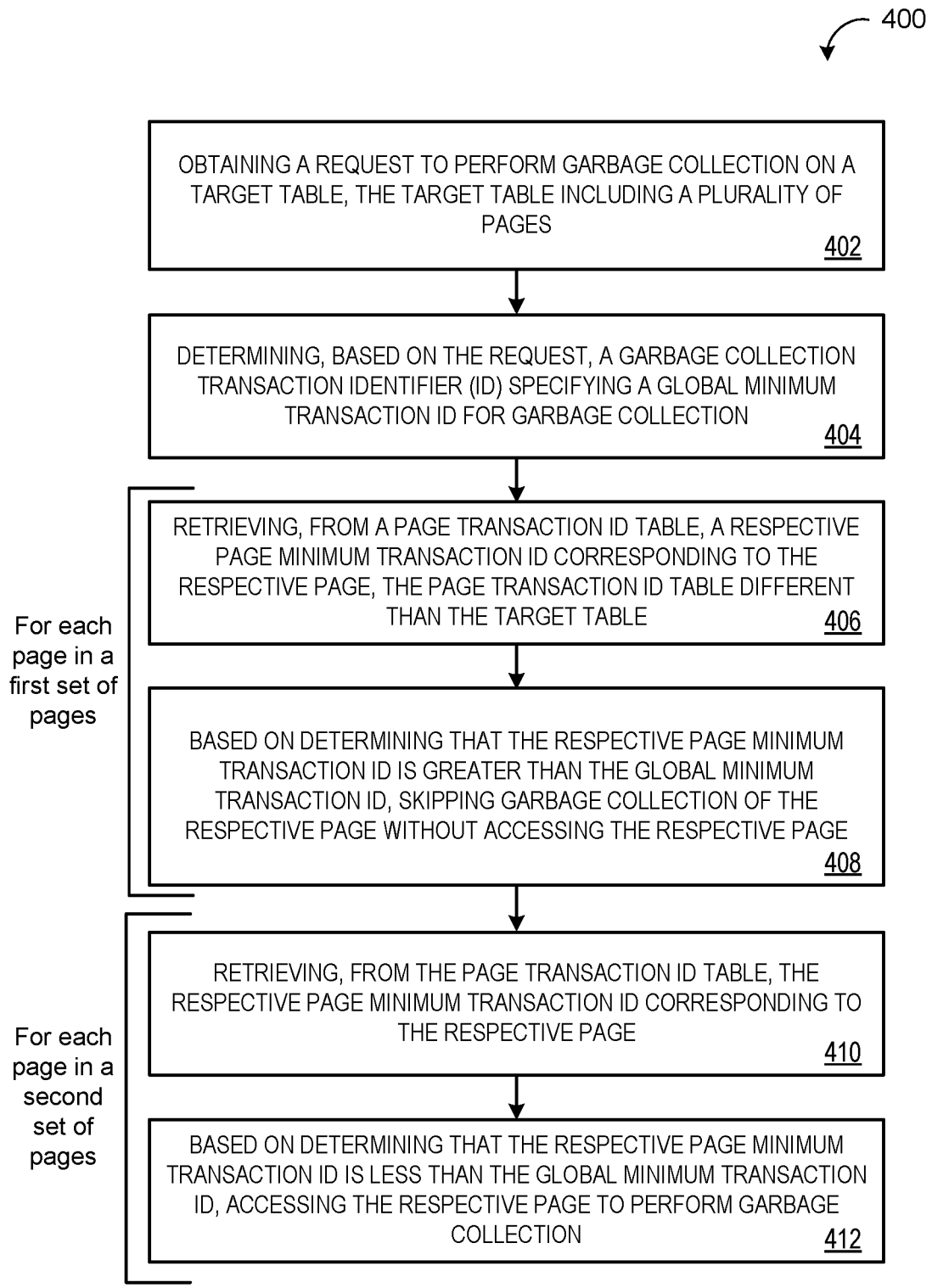
FIG. 4 is a flowchart of an example arrangement of operations for a method of performing efficient garbage collection of a database.

FIG. 4 is a flowchart of an exemplary arrangement of operations for a method 400 for efficient garbage collection of databases. The computer-implemented method 400 is executed by data processing hardware 144 that causes the data processing hardware 144 to perform operations. The method 400, at operation 402, includes obtaining a request 20 to perform garbage collection on a target table 152. The target table 152 includes a plurality of pages 162. Each page 162 of the plurality of pages 162 includes a plurality of rows and columns of data. The method, at operation 404, includes determining, based on the request 20, a garbage collection transaction identifier (ID) 22 specifying a global minimum transaction ID for garbage collection. For each respective page 162 of a first set of pages 162, the method 400 includes, at operation 406, retrieving, from a transaction ID table 154, a respective page minimum transaction ID 174 corresponding to the respective page 162. The transaction ID table 154 is different from the target table 152. The method 400 may include determining that the respective page minimum transaction ID 174 is greater than the global minimum transaction ID 22. Based on determining that the respective page minimum transaction ID 174 is greater than the global minimum transaction ID 22, the method 400, at operation 408, includes skipping garbage collection of the respective page 162 without accessing the respective page 162. For each respective page 162 of a second set of pages 162, the method 400, at operation 410, includes retrieving, from the transaction ID table 154, the respective page minimum transaction ID 174 corresponding to the respective page 162. The method 400 may include determining that the respective page minimum transaction ID 174 is less than or equal to the global minimum transaction ID 22. Based on determining that the respective page minimum transaction ID 174 is less than the global minimum transaction ID 22, the method 400, at operation 412, includes accessing the respective page 162 to perform garbage collection.

Figure 5:
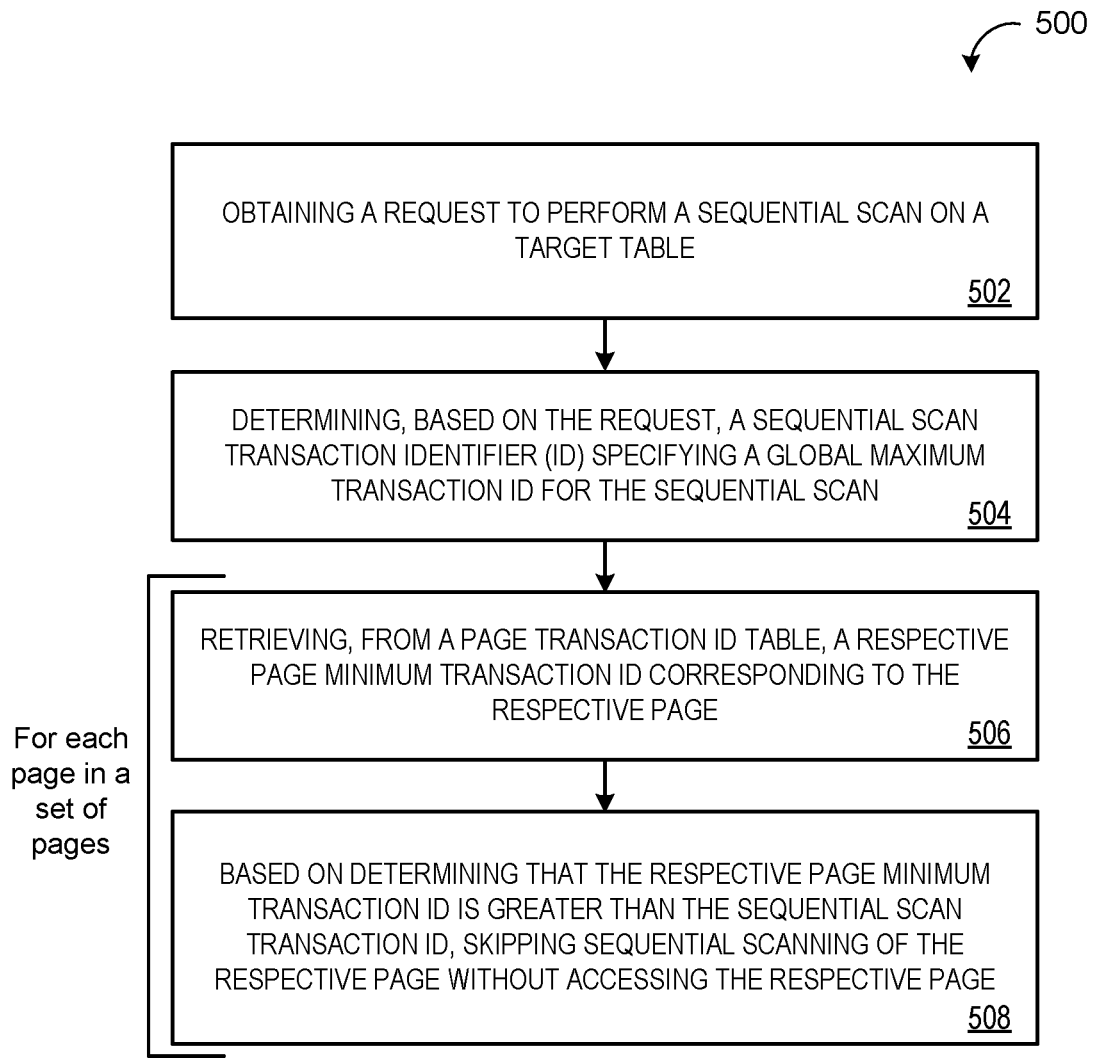
FIG. 5 is a flowchart of an example arrangement of operations for a method of performing efficient sequential scanning of a database.

Referring now to FIG. 5, examples herein have discussed the transaction ID accelerator 160 improving the efficiency of a garbage collection operation, however the transaction ID accelerator 160 may improve the efficiency of any operation that traditionally accesses a large number of pages 162. FIG. 5 is a flowchart of an exemplary arrangement of operations for a method 500 for efficient sequential scanning of databases. The computer-implemented method 500 is executed by data processing hardware 144 that causes the data processing hardware 144 to perform operations. The method 500, at operation 502, includes obtaining a request 20 to perform a sequential scan on a target table 152. The method, at operation 504, includes determining, based on the request 20, a sequential scan transaction ID specifying a maximum transaction ID for the sequential scan. For each respective page 162 of a set of pages 162, the method 500 includes, at operation 506, retrieving, from a transaction ID table 154, a respective page minimum transaction ID 174 corresponding to the respective page 162. The method 500 may include determining that the respective page minimum transaction ID 174 is greater than the sequential scan transaction ID. Based on determining that the respective page minimum transaction ID 174 is greater than the sequential scan transaction ID, the method 500, at operation 508, includes skipping sequential scanning of the respective page 162 without accessing the respective page 162.

In some examples, for each respective page 162 of a set of pages 162, the method 500 includes determining that the respective page minimum transaction ID 174 is less than the sequential scan transaction ID. Based on determining that the respective page minimum transaction ID 174 is less than the sequential scan transaction ID, the method 500 may include scanning the respective page 162.

Thus, the transaction ID accelerator 160 provides a number of benefits for database systems. For example, the transaction ID accelerator 160 provides CPU savings as operations such as garbage collection operations may skip parsing and accessing some pages that conventional garbage collection operations would perform. The transaction ID accelerator 160 also provides I/O savings because the target table is accessed fewer times. The transaction ID accelerator 160 may provide improved cache coherency based on the cache hit ratio. That is, the transaction ID accelerator 160 maintains the cache coherency without bringing in unwanted pages that may evict needed pages. Additionally, the transaction ID accelerator 160 reduces page contention as the garbage collector does not have to fight other transactions for access to the database.

Figure 6:
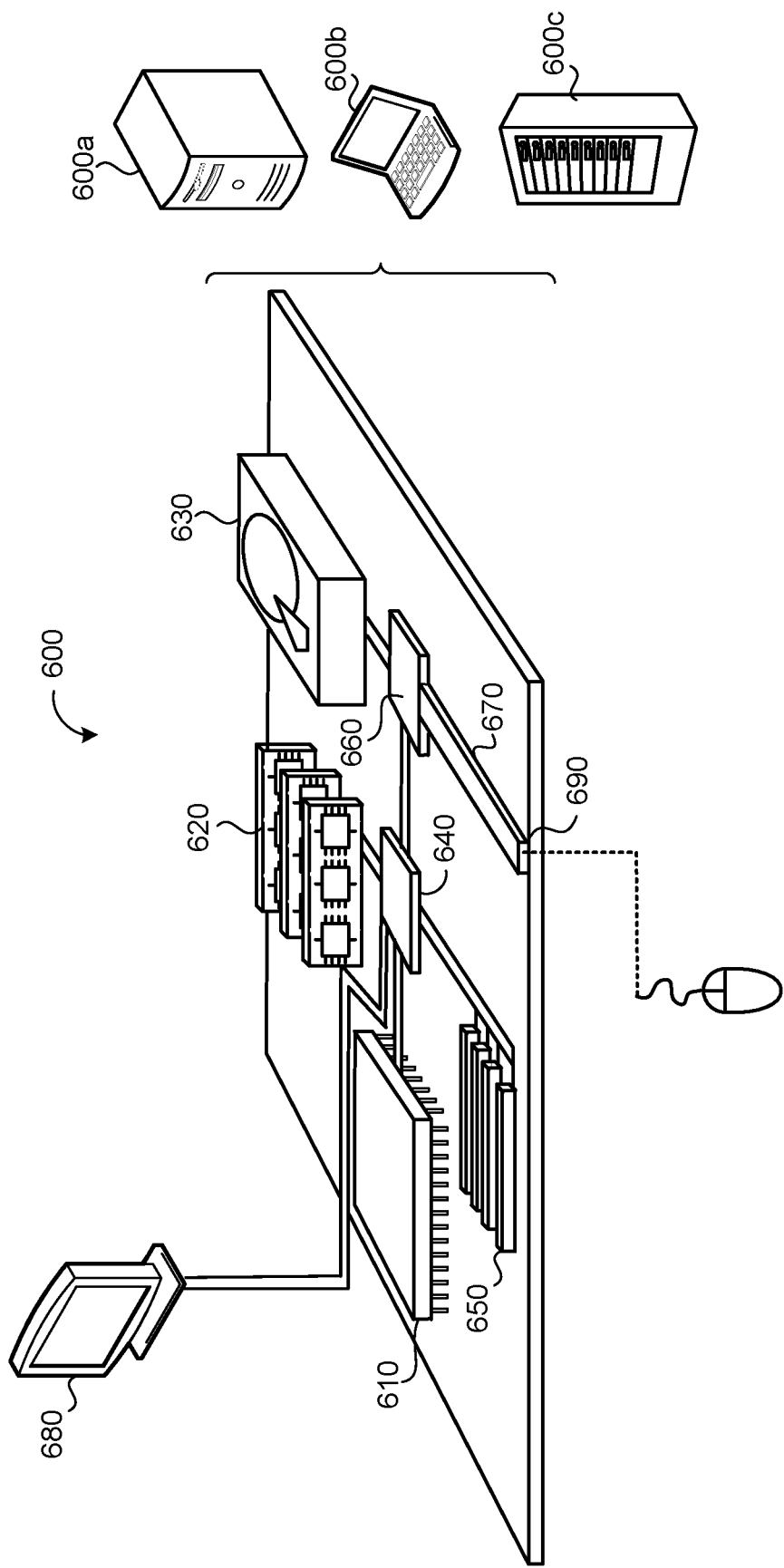
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile 5 feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

10 A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   obtaining a request to perform garbage collection on a target table of a database, the target table comprising a plurality of pages, each page of the plurality of pages comprising a plurality of rows and columns of data;
   determining, based on the request, a garbage collection transaction identifier (ID) specifying a global minimum transaction ID for garbage collection;
   for each respective page of a first set of pages of the plurality of pages:
      retrieving, from a page transaction ID table, a respective page minimum transaction ID corresponding to the respective page, the page transaction ID table different from the target table;
      determining that the respective page minimum transaction ID is greater than the global minimum transaction ID; and
      based on determining that the respective page minimum transaction ID is greater than the global minimum transaction ID, skipping garbage collection of the respective page without accessing the respective page; and
   for each respective page of a second set of pages of the plurality of pages:
      retrieving, from the page transaction ID table, the respective page minimum transaction ID corresponding to the respective page;
      determining that the respective page minimum transaction ID is less than the global minimum transaction ID; and
      based on determining that the respective page minimum transaction ID is less than the global minimum transaction ID, accessing the respective page to perform garbage collection.

2. The method of claim 1, wherein the operations further comprise:
   receiving a request to modify one of the pages of the plurality of pages of the target table;
   based on the request to modify the one of the pages, modifying the one of the pages, the modification associated with a transaction ID;
   retrieving, from the page transaction ID table, the respective page minimum transaction ID corresponding to the one of the pages;
   determining that the transaction ID associated with the modification is lower than the respective page minimum transaction ID corresponding to the one of the pages; and
   based on determining that the transaction ID associated with the modification is lower than the respective page minimum transaction ID corresponding to the one of the pages, updating the respective page minimum transaction ID with the respective page minimum transaction ID corresponding to the one of the pages.

3. The method of claim 1, wherein the operations further comprise, after accessing the respective page to perform garbage collection, for each respective page of the second set of pages of the plurality of pages:
   determining an updated page minimum transaction ID for the respective page of the second set of pages of the plurality of pages; and
   updating the page transaction ID table with the updated page minimum transaction ID for the respective page of the second set of pages of the plurality of pages.

4. The method of claim 3, wherein determining the updated minimum transaction ID for the respective page of the second set of pages of the plurality of pages comprises:
 retrieving a row minimum transaction ID for each row of the respective page; and
 determining a smallest row minimum transaction ID of the rows of the respective page.

5. The method of claim 3, wherein updating the page transaction ID table with the updated minimum transaction ID for the respective page of the second set of pages of the plurality of pages comprises writing a generic write-ahead log (WAL) record.

6. The method of claim 1, wherein the page transaction ID table comprises a plurality of ID pages, and wherein each ID page of the page transaction ID table comprises a plurality of page minimum transaction IDs.

7. The method of claim 1, wherein the operations further comprise, for each respective page of a third set of pages of the plurality of pages:
 determining that the respective page does not have a corresponding page minimum transaction ID;
 based on determining that the respective page does not have the corresponding page minimum transaction ID, accessing the respective page to perform garbage collection;
 after accessing the respective page to perform garbage collection, determining the minimum transaction ID for the respective page; and
 updating the page transaction ID table with the determined minimum transaction ID for the respective page.

8. The method of claim 1, wherein the operations further comprise:
 obtaining a request to perform a sequential scan on the target table;
 determining, based on the request, a sequential scan transaction ID specifying a maximum transaction ID for the sequential scan; and
 for each respective page of a third set of pages of the plurality of pages:
  retrieving, from the page transaction ID table, the respective page minimum transaction ID corresponding to the respective page;
  determining that the respective page minimum transaction ID is greater than the sequential scan transaction ID; and
  based on determining that the respective page minimum transaction ID is greater than the sequential scan transaction ID, skipping sequential scanning of the respective page without accessing the respective page.

9. The method of claim 8, wherein the operations further comprise, for each respective page of a fourth set of pages of the plurality of pages:
 retrieving, from the page transaction ID table, the respective page minimum transaction ID corresponding to the respective page;
 determining that the respective page minimum transaction ID is less than the sequential scan transaction ID; and
 based on determining that the respective page minimum transaction ID is less than the sequential scan transaction ID, scanning the respective page.

10. The method of claim 1, wherein retrieving the respective page minimum transaction ID corresponding to the respective page comprises determining a location of the respective page minimum transaction ID based on a logical shift of a page number of the respective page.

11. A system comprising:
 data processing hardware; and
 memory hardware in communication with the data processing hardware, the memory hardware storing instructions that when executed on the data processing hardware cause the data processing hardware to perform operations comprising:
  obtaining a request to perform garbage collection on a target table of a database, the target table comprising a plurality of pages, each page of the plurality of pages comprising a plurality of rows and columns of data;
  determining, based on the request, a garbage collection transaction identifier (ID) specifying a global minimum transaction ID for garbage collection;
  for each respective page of a first set of pages of the plurality of pages:
   retrieving, from a page transaction ID table, a respective page minimum transaction ID corresponding to the respective page, the page transaction ID table different from the target table;
   determining that the respective page minimum transaction ID is greater than the global minimum transaction ID; and
   based on determining that the respective page minimum transaction ID is greater than the global minimum transaction ID, skipping garbage collection of the respective page without accessing the respective page; and
  for each respective page of a second set of pages of the plurality of pages:
   retrieving, from the page transaction ID table, the respective page minimum transaction ID corresponding to the respective page;
   determining that the respective page minimum transaction ID is less than the global minimum transaction ID; and
   based on determining that the respective page minimum transaction ID is less than the global minimum transaction ID, accessing the respective page to perform garbage collection.

12. The system of claim 11, wherein the operations further comprise:
 receiving a request to modify one of the pages of the plurality of pages of the target table;
 based on the request to modify the one of the pages, modifying the one of the pages, the modification associated with a transaction ID;
 retrieving, from the page transaction ID table, the respective page minimum transaction ID corresponding to the one of the pages;
 determining that the transaction ID associated with the modification is lower than the respective page minimum transaction ID corresponding to the one of the pages; and
 based on determining that the transaction ID associated with the modification is lower than the respective page minimum transaction ID corresponding to the one of the pages, updating the respective page minimum transaction ID with the respective page minimum transaction ID corresponding to the one of the pages.

13. The system of claim 11, wherein the operations further comprise, after accessing the respective page to perform garbage collection, for each respective page of the second set of pages of the plurality of pages:

determining an updated page minimum transaction ID for the respective page of the second set of pages of the plurality of pages; and updating the page transaction ID table with the updated page minimum transaction ID for the respective page of the second set of pages of the plurality of pages.

14. The system of claim 13, wherein determining the updated minimum transaction ID for the respective page of the second set of pages of the plurality of pages comprises:

retrieving a row minimum transaction ID for each row of the respective page; and determining a smallest row minimum transaction ID of the rows of the respective page.

15. The system of claim 13, wherein updating the page transaction ID table with the updated minimum transaction ID for the respective page of the second set of pages of the plurality of pages comprises writing a generic write-ahead log (WAL) record.

16. The system of claim 11, wherein the page transaction ID table comprises a plurality of ID pages, and wherein each ID page of the page transaction ID table comprises a plurality of page minimum transaction IDs.

17. The system of claim 11, wherein the operations further comprise, for each respective page of a third set of pages of the plurality of pages:

determining that the respective page does not have a corresponding page minimum transaction ID;

based on determining that the respective page does not have the corresponding page minimum transaction ID, accessing the respective page to perform garbage collection;

after accessing the respective page to perform garbage collection, determining the minimum transaction ID for the respective page; and updating the page transaction ID table with the determined minimum transaction ID for the respective page.

18. The system of claim 11, wherein the operations further comprise:

obtaining a request to perform a sequential scan on the target table;

determining, based on the request, a sequential scan transaction ID specifying a maximum transaction ID for the sequential scan; and for each respective page of a third set of pages of the plurality of pages:

retrieving, from the page transaction ID table, the respective page minimum transaction ID corresponding to the respective page;

determining that the respective page minimum transaction ID is greater than the sequential scan transaction ID; and based on determining that the respective page minimum transaction ID is greater than the sequential scan transaction ID, skipping sequential scanning of the respective page without accessing the respective page.

19. The system of claim 18, wherein the operations further comprise, for each respective page of a fourth set of pages of the plurality of pages:

retrieving, from the page transaction ID table, the respective page minimum transaction ID corresponding to the respective page;

determining that the respective page minimum transaction ID is less than the sequential scan transaction ID; and based on determining that the respective page minimum transaction ID is less than the sequential scan transaction ID, scanning the respective page.

20. The system of claim 11, wherein retrieving the respective page minimum transaction ID corresponding to the respective page comprises determining a location of the respective page minimum transaction ID based on a logical shift of a page number of the respective page.

* * * * *